(12) United States Patent
Son et al.

(10) Patent No.: US 6,765,545 B2
(45) Date of Patent: Jul. 20, 2004

(54) STEREOSCOPIC IMAGE DISPLAY SYSTEM USING POLARIZATION CHARACTERISTICS OF A LIQUID CRYSTAL DEVICE PANEL

(75) Inventors: Jung-Young Son, Sungnam (KR); Sung-Sik Kim, Siheung (KR); Ji-Eun Bahn, Seoul (KR)

(73) Assignees: Samsung Electronics Co., Ltd., Suwon-si (KR); Korea Institute of Science and Technology (KIST), Seoul (KR)

( * ) Notice: Subject to any disclaimer, the term of this patent is extended or adjusted under 35 U.S.C. 154(b) by 342 days.

(21) Appl. No.: 09/895,191

(22) Filed: Jul. 2, 2001

(65) Prior Publication Data

US 2002/0005820 A1 Jan. 17, 2002

(30) Foreign Application Priority Data

Jul. 4, 2000 (KR) ....................................... 2000-38039

(51) Int. Cl.[7] ................................................ G09G 5/00
(52) U.S. Cl. ..................... 345/7; 345/9; 345/8; 345/32; 345/86; 345/87; 359/464; 359/465; 348/40; 348/45; 348/46; 348/49; 348/54
(58) Field of Search ................................ 345/7, 9, 175, 345/8, 86, 32, 87; 348/60, 57, 42, 51, 45, 46, 40, 49, 54; 359/464, 465; 349/106, 113, 138, 42, 86

(56) References Cited

U.S. PATENT DOCUMENTS

| 5,132,839 A | | 7/1992 | Travis |
| 5,568,314 A | | 10/1996 | Omori et al. |
| 5,703,717 A | | 12/1997 | Ezra et al. |
| 5,712,732 A | * | 1/1998 | Street ........................ 359/630 |
| 5,774,261 A | | 6/1998 | Omori et al. |
| 6,002,518 A | * | 12/1999 | Faris .......................... 359/465 |
| 6,314,248 B1 | * | 11/2001 | Ohmura et al. ............. 396/429 |
| 6,407,724 B2 | * | 6/2002 | Waldern et al. ................ 345/8 |
| 6,449,005 B1 | * | 9/2002 | Faris .......................... 348/60 |
| 6,449,090 B1 | * | 9/2002 | Omar et al. ................ 359/465 |

FOREIGN PATENT DOCUMENTS

| JP | 8-186849 | 7/1996 |
| JP | 8-307907 | 11/1996 |
| JP | 9-146044 | 6/1997 |
| JP | 9-159971 | 6/1997 |
| JP | 10-148796 | 6/1998 |
| KR | 1991-10375 | 6/1991 |
| KR | 1999-0069140 | 9/1999 |

* cited by examiner

Primary Examiner—Richard Hjerpe
Assistant Examiner—Ali Zamani
(74) Attorney, Agent, or Firm—Robert E. Bushnell, Esq.

(57) ABSTRACT

The present invention relates to a stereoscopic image display system using polarization characteristics of a liquid crystal display panel, which realizes a stereoscopic image by disposing in an entrance pupil or in an exit pupil of a projection lens a polarization plate arranged for two polarization plates of an circular polarization opposite to each other in polarization directions or two linear polarization plates having a polarization direction of a 90 degree difference to each other to be fitted in the left and right sides on a center line, projecting left and right images of a display device panel on a screen through a projection lens in the left and right polarization directions of the polarization plate, splitting an image of the polarization plate, that is, the left and right images through viewing zones, and forming the viewing zones which can view images corresponding to the left and right eyes having the same polarization as the polarization plate. No spectacles are needed and multiple viewing points are accommodated.

42 Claims, 7 Drawing Sheets

STEREOSCOPIC IMAGE DISPLAY SYSTEM USING POLARIZATION CHARACTERISTICS OF A LIQUID CRYSTAL DEVICE PANEL

CLAIM OF PRIORITY

This application makes reference to, incorporates the same herein, and claims all benefits accruing under 35 U.S.C. §119 from an application for A STEREOSCOPIC VIDEO DISPLAY SYSTEM USING A POLARIZATION CHARACTERISTIC OF LIQUID CRYSTAL TYPE DISPLAY PANEL earlier filed in the Korean Industrial Property Office on Jul. 4, 2000 and there duly assigned Serial No. 2000-38039.

The present invention relates to a stereoscopic image display system using polarization characteristics of a liquid crystal device panel and an illumination device for the liquid crystal device panel, and more particularly to a stereoscopic image display system using polarization characteristics of a liquid crystal device panel and an illumination unit for the liquid crystal device panel, capable of forming viewing zones for different images on the right and left by transmitting image signals with the same polarization characteristics as the polarization surfaces, wherein the liquid crystal device panel is disposed at an entrance pupil or an exit pupil of projection optics and has a polarization plate formed with two polarization surfaces of different polarization characteristics joined at a center line.

According to the present invention, inconvenience can be removed that is caused by using auxiliary tools such as spectacles or shutter spectacles having the same optical characteristics used in a moving viewing zone mode employing a color difference, a polarization difference, a time difference, and so on used to realize a conventional stereoscopic image as images of the left and right eyes.

Moreover, the present invention can realize a non-spectacles type stereoscopic image system and a multiple viewing-point stereoscopic image system based on a head tracking mode by using the polarization characteristics of a liquid crystal device panel which separates left and right zones.

DESCRIPTION OF THE BACKGROUND ART

In general, a stereoscopic image display system is a system that enables a viewer to stereoscopically recognize images by projecting the images viewed in different directions on the left and right eyes in use of a binocular parallax.

In the mean time, for the modes of separating images of the left and right eyes, there are a moving viewing zone mode of a spectacles type which uses a color difference, a polarization difference, a time difference, and so on, and a fixed viewing zone mode of a non-spectacles type which uses specialized optical parts.

In the moving viewing zone mode, a stereoscopic perception is obtained in use of spectacles having the same optical characteristics as the images projected on the left and right eyes or in use of shutter spectacles which open and close in the same period as that alternating and projecting the images projected on the left and right eyes. In this case, the spectacles play a role of the moving viewing zone since a user can move while wearing the spectacles.

In the fixed viewing zone mode, a viewing zone is formed on the whole screen on which images are projected, given as images of a pupil of a projection optics which projects images corresponding to the left and right eyes by a screen. In this case, the movements of a viewing zone are available in part by the viewing point or the head tracking mode, but the range of which is limited.

For a stereoscopic image display system of using polarization characteristics, there are a spectacles type of using polarization spectacles and a non-spectacles type of using a polarization strip plate so far.

The above polarization spectacles type was developed in about 1890, in which the stereoscopic perception is obtained by projecting images corresponding to the left and right eyes on a screen with polarization directions thereof different to each other in 90 degrees, using polarization spectacles which arrange polarization plates having the same polarization directions as images on the eyes, and transmitting only the images having the polarizations of spectacles corresponding to the respective eyes.

A polarization strip plate is a plate in which polarization strips are alternatively arranged in 90 degrees difference to each other in a polarization direction, which are arranged for respective images corresponding to the left and right eyes by pixel lines and then tightly contacted to a liquid crystal device plate, to thereby separate the images corresponding to the left and right eyes by respective polarization. Next, the separated images are convergent through a Fresnel lens to form a viewing zone, to thereby recognize the stereoscopic perception.

However, in case of the polarization spectacles type, there exists a problem in that a user has to wear spectacles first of all and the stereoscopic perception gets lost since images in two polarization directions are mixed up with the head of the user turning a bit to the left or right side. Further, in case of the polarization strip plate, there exists a problem in that the polarization spectacles type is hardly realized since there exist difficulties in establishing a distance between a polarization strip plate and a liquid crystal device panel and a correspondence relation between a polarization strip width and a pixel line width of the liquid crystal device panel.

In order to review in more detail the problems of the conventional stereoscopic image display system, a description on a structure and operations of the most common stereoscopic image display system will be made as follows.

U.S. Pat. No. 5,132,839 issued to Travis for Three Dimensional Display Device discloses a stereoscopic image display unit including an image display unit is constituted with a cathode-ray tube(CRT) for three red(R), green(G), and blue(B) colors and a beam splitter for converging an image displayed on the CRT in one direction. An image displayed on the image display unit is projected on a projection screen through an exit pupil of a projection lens.

Accordingly, an image of the exit pupil of the projection lens is formed on the front side of the screen, which operates as a viewing zone. In order to form a stereoscopic viewing zone, first and second shutters are disposed to bisect the exit pupil.

In operations of the stereoscopic image display system based on the shutters, if an image corresponding to the left eye is displayed on the image display unit, the first shutter opens and the second shutter closes, in order for an image by the screen of the second shutter to work as a left side viewing zone. Further, if an image according to the right eye, the second shutter opens and the first shutter closes, in order for an image by the screen of the first shutter to work as a right side viewing zone.

At this time, by placing the left side viewing zone 6.5 cm (centimeters) away from the right side viewing zone to correspond to the distance of the eyes, a viewer can perceive a stereoscopic image. In order to display a stereoscopic image by the shutters, the image display unit has to have a response speed at least twice as fast compared to a general image display unit.

The first and second shutters transmit only images corresponding to the eyes, so that the brightness of the images on the screen is reduced in a reverse proportion to the number of shutters.

U.S. Pat. No. 5,703,717 issued to Ezra et al. for Three-Dimensional Projection Display Apparatus discloses a stereoscopic image display system including an image display unit constituted with first and second image display plates and for displaying images corresponding to the left and right eyes and first and second light sources for independently illuminating the first and second image display plates respectively through first and second focusing lenses.

Light transmitted through the first and second image display plates become incident on a projection lens by a beam indicator. The light incident on the projection lens is projected to an image screen again, an image of an exit pupil of the projection lens by the image projection screen is formed on the front side of the image projection screen.

At this time, an image by the first light source is formed on the right side of the exit pupil through the first focusing lens, and an image of the second light source is formed on the left side of the exit pupil through the second focusing lens.

That is, the images through the first and second focusing lens of the first and second light sources are focused again by the image projection screen to form the viewing zones.

The above system has a problem in that the use of focusing lenses is required, the positions of the light sources and the focusing lenses should be exact since viewing zones are formed by images of light sources, primary images by the focusing lenses of the light sources should be exactly formed in the exit pupils of the projection lenses, and opaque portions occur in case that a user makes the movements of a viewing point since the left and right viewing zones become intermittent unless the images of the light sources are exactly superimposed and then combined.

Further, the above system causes troublesomeness in that the positions of the light sources move with viewing points in order to display the multiple viewing-point images.

SUMMARY OF THE INVENTION

It is therefore an object of the present invention to provide a stereoscopic image display system using polarization characteristics of a liquid crystal device panel, capable of providing a stereoscopic perception of images without wearing spectacles by disposing in an entrance pupil or in an exit pupil of a projection lens a polarization plate arranged for two polarization plates of an original polarization opposite to each other in polarization directions or for two linear polarization plates having a polarization direction of a 90 degree difference to each other to be fitted in the left and right sides on a center line, projecting left and right images of a display device panel on a screen through a projection lens in the left and right polarization directions of the polarization plate, and getting different images from images of the polarization plate or images of a viewing zone incident on the left and right eyes respectively.

It is another object to have a stereoscopic image display system that can be easily manufactured and easily used.

It is still another object to have a stereoscopic image display system that can reduce the cost of manufacture.

It is yet another object to have a stereoscopic image display system that can increase the quality of the image being viewed without fatiguing the eyes of a user.

A structure of the present invention for achieving the above objects includes a phase retarder which polarizes a light source of images coming out of two liquid crystal display panels to have a phase difference of 90 degrees or causes the light source to have circular polarization in a different direction, a polarization beam splitter, a polarization plate, plural lenses, a light source for irradiating light on the liquid crystal display panels, an image projection screen for projecting images by converging light sources having the image information, and so on.

According to the present invention, inconvenience can be removed that is caused by using auxiliary tools such as spectacles or shutter spectacles having the same optical characteristics used in a moving viewing zone mode employing a color difference, a polarization difference, a time difference, and so on used to realize a conventional stereoscopic image as images of the left and right eyes.

Moreover, the present invention can realize a non-spectacles type stereoscopic image system and a multiple viewing-point stereoscopic image system based on a head tracking mode by using the polarization characteristics of a liquid crystal device panel which separates left and right zones.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

Hereinafter, a structure and operations of a preferred embodiment of the present invention will be described in more detail through the accompanying drawings.

Figure 1A:
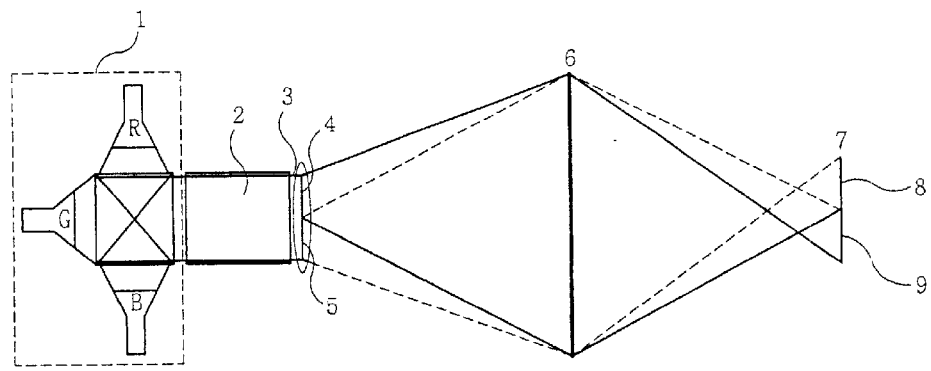
FIG. 1a and FIG. 1b are views for showing general stereoscopic image display systems in the prior art.
Figure 1B:
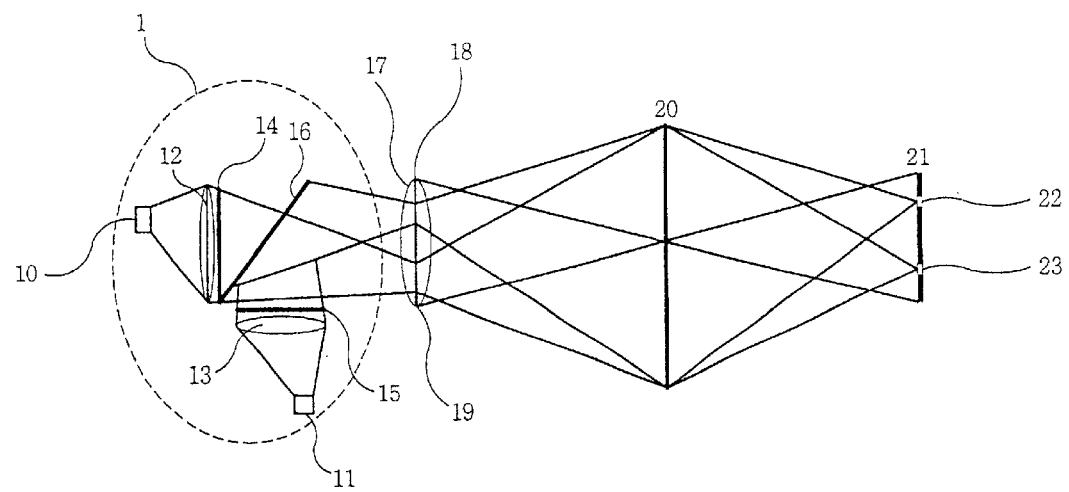

FIGS. 1a and 1b show a principle of forming a viewing zone for a stereoscopic images display system of a fixed viewing zone mode of a general projection type.

FIG. 1a is a view for explaining a stereoscopic image display system disclosed in U.S. Pat. No. 5,132,839. As shown in FIG. 1a, an image display unit 1a is constituted with a cathode-ray tube (CRT) for three red (R), green (G), and blue (B) colors and a beam splitter for converging an image displayed on the CRT in one direction.

An image displayed on the image display unit 1a is projected on a projection screen 6 through an exit pupil 3 of a projection lens 2. Accordingly, an image 7 of the exit pupil of the projection lens 2 is formed on the front side of the screen 6, which operates as a viewing zone. In order to form a stereoscopic viewing zone, first and second shutters 4 and 5 are disposed to bisect the exit pupil 3. In operations of the stereoscopic image display system based on the shutters 4 and 5, if an image corresponding to the left eye is displayed on the image display unit 1a, the first shutter 4 opens and the second shutter 5 closes, in order for an image 9 by the screen 6 of the second shutter 5 to work as a left side viewing zone.

Further, if an image according to the right eye, the second shutter 5 opens and the first shutter 4 closes, in order for an image 8 by the screen 6 of the first shutter 4 to work as a right side viewing zone.

At this time, by placing the left side viewing zone 6.5 cm (centimeters) away from the right side viewing zone to correspond to the distance of the eyes, a viewer can perceive a stereoscopic image. In order to display a stereoscopic image by the shutter 4 and 5, the image display unit 1a has to have a response speed at least twice faster compared to a general image display unit.

The first and second shutter 4 and 5 transmit only images corresponding to the eyes, so that the brightness of the images on the screen is reduced in a reverse proportion to the number of shutters.

In the meantime, FIG. 1b is a view for explaining a stereoscopic image display system disclosed in U.S. Pat. No. 5,703,717 issued to Ezra et al. for Three-Dimensional Projection Display Apparatus. As shown in FIG. 1b, an image display unit 1b is constituted with first and second image display plates 14 and 15 for displaying images corresponding to the left and right eyes and first and second light sources 10 and 11 for independently illuminating the first and second image display plates 14 and 15 respectively through first and second focusing lenses 12 and 13.

Light transmitted through the first and second image display plates 14 and 15 becomes incident on a projection lens 24 by a beam indicator 16.

The light incident on the projection lens 24 is projected to an image screen 20 again, an image 21 of an exit pupil 17 of the projection lens 24 by the image projection screen 20 is formed on the front side of the image projection screen 20.

At this time, an image by the first light source 10 is formed on the right side 19 of the exit pupil 17 through the first focusing lens 12, and an image of the second light source 11 is formed on the left side 18 of the exit pupil 17 through the second focusing lens 13.

That is, the images 19 and 18 through the first and second focusing lens 12 and 13 of the first and second light sources 10 and 11 are focused again by the image projection screen 20 to form is the viewing zones 22 and 23.

Figure 2:
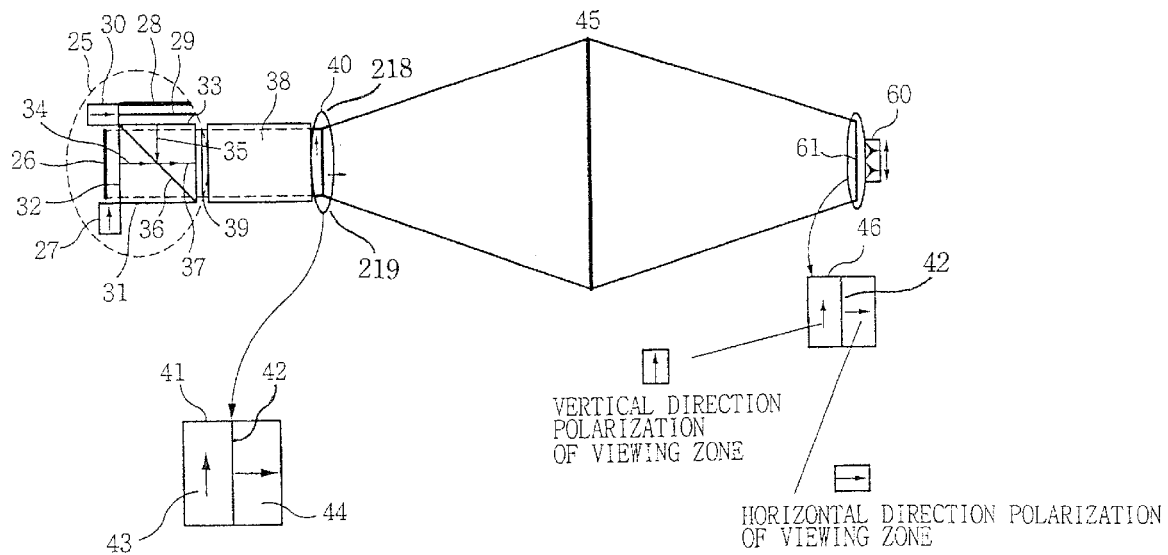
FIG. 2 is a view for showing a stereoscopic image display system according to the present invention.

FIG. 2 is a view for showing a principle of forming viewing zones of a stereoscopic image display system according to an embodiment of the present invention.

As shown in FIG. 2, a stereoscopic image display system according to an embodiment of the present invention includes an image display unit 25, a polarization plate 41, a projection lens 38, and an image projection screen 45.

From the constituents of the present invention, the image display unit 25 includes first and second liquid crystal display panels 26 and 28, a broadband phase retarder 29, a polarization beam splitter 31, and an illumination unit.

In order to realize a stereoscopic image of a non-spectacles type by a light source including image information, the first and second liquid crystal display panels 26 and 28 of a vertical polarization direction 27 is disposed in parallel with two adjacent sides 32 and 33 of the polarization beam splitter 31 while the liquid crystal display panels are displaced in 90 degrees to each other. In front of the liquid crystal display panel 26 is one side 32 of the polarization beam splitter 31. In front of the liquid crystal display panel 28 is another side 33 of the polarization beam splitter 31. Next, the phase retarder 29 is positioned in order for a polarization direction of an image beam to have a phase difference of 90 degrees as to the light source of the first liquid crystal display panel 26 by rotating a phase of the image beam by 90 degrees on the front side of the second liquid crystal display panel 28, or to have different circular polarizations to each other. In FIG. 2, a 90 degree phase retarder is disposed. Further, if light by the light source is irradiated on the two image display panels of a liquid crystal type, an image 34 from the first liquid crystal display panel 26 is directly projected by the characteristics of the polarization beam splitter 31, and an image 35 from the second liquid crystal display panel 28 is reflected at an angle of 45 degrees as to a junction surface of the polarization beam splitter 31, so that the images 34 and 35 from the two liquid crystal display panels 26 and 28 having a polarization direction of 90 degrees to each other are added to be incident on a projection lens 38 as one image beam 37.

Here, the phase retarder 29 are not required in case that the polarization directions of the first and second liquid crystal display panels 26 and 28 have different polarization characteristics.

The polarization plate 41 is placed on all of an exit pupil 40 for covering all range of the exit pupil 40 of the projection lens 38. The polarization plate 41 has two different polarization surfaces, one in the right of the central boundary line 42 and the other in the left of the central boundary line 42. The polarization plate 41 has, with a center line, polarization surfaces in which the left polarization direction 43 is coincident with a polarization direction of the image 34 projected from the liquid crystal display panel 26 vertically placed to the drawing and the right polarization direction 44 is coincident with a polarization direction of the image 35 projected from the liquid crystal display panel 28 horizontally placed to the drawing, the images 34 and 35 having two polarization directions different to each other are separated to be projected on the image projection screen 45 through the projection lens 38.

The polarization plate 41 causes images to appear on an exit pupil 40 of the projection lens 38 as magnified, as contracted, or as they are by part of the lenses constituting the projection lens 38, and the appeared images forms again a viewing zone having the polarization directions different to each other in the left and right as magnified, as contracted, or as they are by the image projection screen 45.

That is, the viewing zone 46 are separated for the images 34 and 35 having different polarization directions to constitute different viewing zones by a center line 42. Therefore, the viewing zone 46 is constituted with image beams having a 90 degree polarization difference of 90 degrees to each other or having circular polarizations of opposite directions to each other for the viewing zones corresponding to the left and right eyes. In FIG. 2, viewing zones representing a stereoscopic image based on beams having a polarization difference of 90 degrees are produced.

Next, in case that the polarization plate 41 is placed in the exit pupil 40 of the projection lens 38, a beam having image information passes through the polarization plate 41 to form the viewing zone 46 by the image projection screen.

The center solid line 42 of the polarization plate 41 is not an actually drawn line but indicates a boundary of two polarization surfaces since the polarization plate 41 is a plate having two polarization surfaces of vertical and horizontal polarizations or the circular polarizations of the left and right directions. Reference 27 shows a vertical polarization direction while reference 30 shows a horizontal polarization direction.

Figure 3:
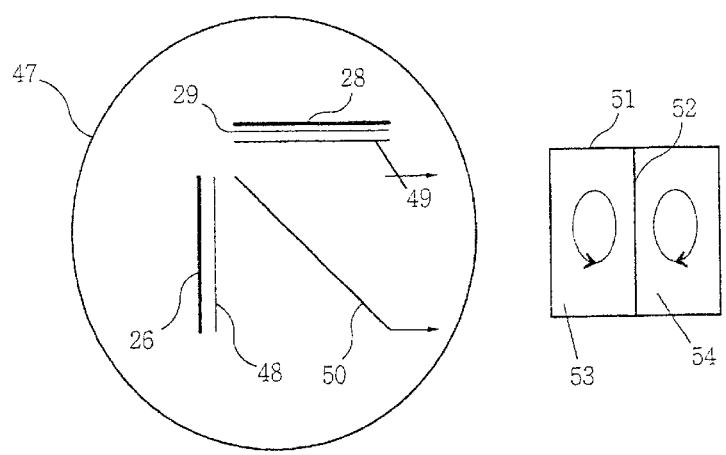
FIG. 3 is a view for showing an image display unit using a circular polarization and a structure of a polarization plate.

FIG. 3 is a view for showing an arrangement of an image display unit 47 using circular polarization and a structure of polarization plate according to an embodiment of the present invention.

As shown in FIG. 3, with the polarization directions of the first and second display panels of a liquid crystal type 26 and 28 having a 90 degrees difference, as light containing respective images passes through quarter wavelength wave plates 48 and 49, images of circular polarizations opposite to each other in polarization directions are obtained, and the circular polarization images are converged in one direction by a beam splitter 50. A polarization plate 51 corresponding thereto should be a plate of circular polarizations opposite to each other in circular polarization directions 53 and 54 at the center line 52. Light, which is projected from the first and second liquid crystal display panels, pass through the quarter wavelength wave plates, and polarized to have different circular polarizations is separated to have only image signals corresponding to the left and right eyes respectively.

Figure 4:
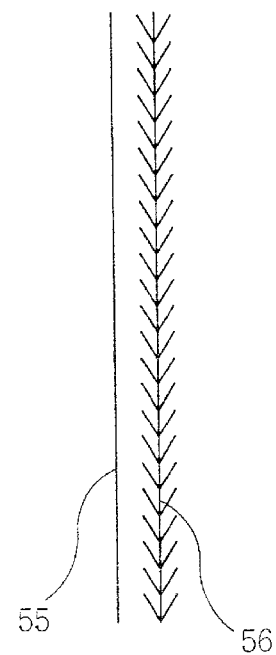
FIG. 4 is a view for showing a structure of an image display unit using one liquid display device panel.

FIG. 4 is a view for showing a structure of an image display unit using one liquid crystal display panel 55.

As shown in FIG. 4, the phase retarder 56 which can be automatically driven as the liquid crystal of the liquid crystal display panel 55 is employed, the liquid crystal display panel 55 and the phase retarder 56 which are driven at a high speed are used. The image display unit of FIG. 4 can replace the image display unit 25 if polarization directions of images corresponding to the left and right eyes are made different to each other by driving the phase retarder 56 in case that an image corresponding to the right (left) eye is displayed with the phase retarder 56 not driven in case that an image corresponding to the left (right) eye is displayed on the display plate 55 of a liquid crystal type.

Figure 5:
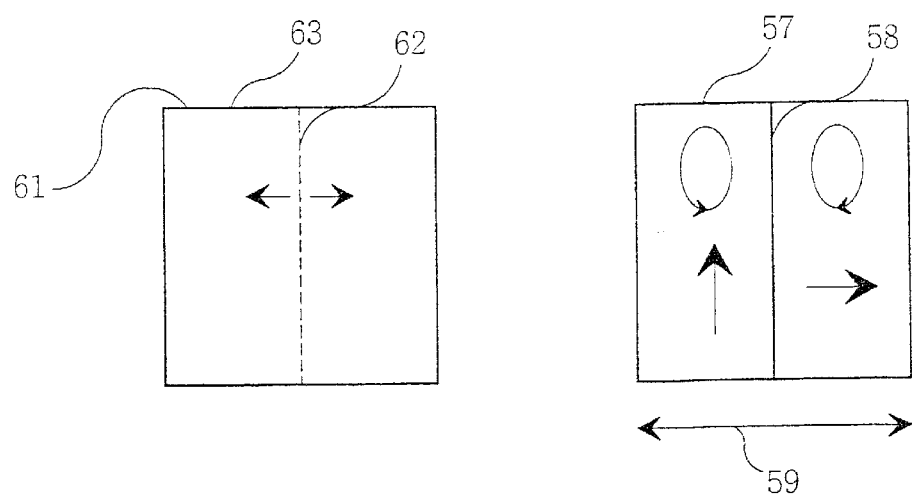
FIG. 5 is a view for showing a structure of a multiple viewing point image display unit of viewing point or head tracking.

FIG. 5 is a view for showing a structure of a polarization plate used in a multiple viewing-point stereoscopic image system by viewing point or head tracking.

As shown in FIG. 2, if a viewing point moves to the left and right in the viewing zone 46, the polarization plates 41 and 51 move to the left and right accordingly to display the images corresponding to the movements of the viewing points on the image projection screen by the first and second liquid crystal display panels 26 and 28, so that the display of multiple viewing point stereoscopic images by the viewing point or head tracking is enabled. There is a method of forming the width 59 of a polarization plate 57 twice as long as a diameter of the entrance pupil 39 or the exit pupil 40, placing a center line 58 at a position where the entrance pupil 39 or the exit pupil 40 bisected in the left and right, and moving a polarization plate 57 in a vertical direction while rotating it in correspondence with the movements of the viewing point 60, and a method of moving a polarization plate 61 in the left and right in correspondence with a center line 62 and the movements of viewing points by using a polarization plate, which can be electronically driven such as a liquid crystal, having the same width as a diameter of the entrance pupil 39 or the exit pupil 40. At this time, the maximum distance available for the center line 62 to move in the left and right becomes a half of the diameter of the entrance pupil 39 or the exit pupil 40 in the respective directions. The exit pupil 40 has a left 218 and a right 219 side.

Figure 6A:
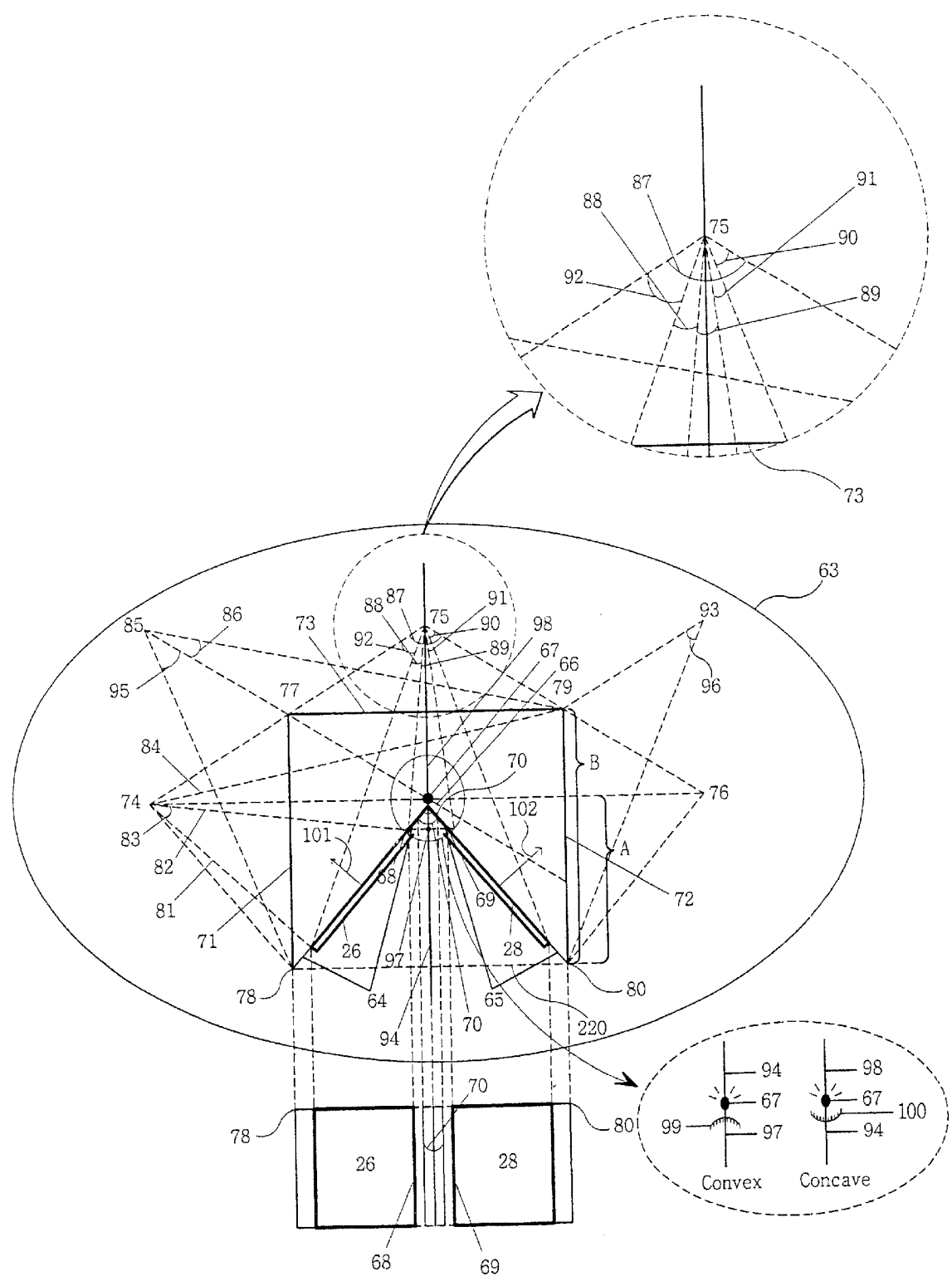
FIG. 6a and FIG. 6b are views for a structure of a reflection unit constructed in an image display unit according to a preferred embodiment of the present invention.
Figure 6B:
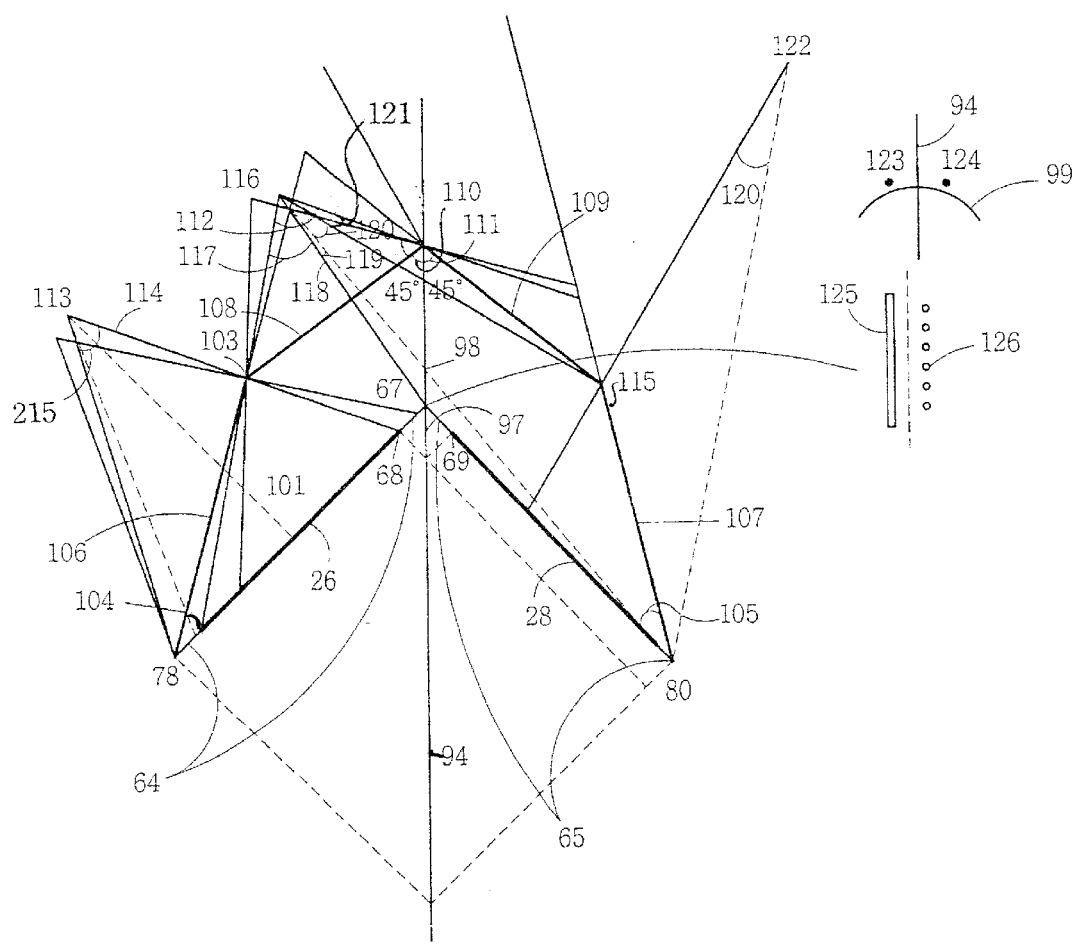

FIG. 6a and FIG. 6b are views for showing a structure of an image display unit 1c using one light source according to an embodiment of the present invention.

Returning to FIG. 2, in the stereoscopic image display system according to the embodiment of the present invention, the two liquid crystal display panels 26 and 28 for displaying two images corresponding to the left and right eyes are disposed in parallel with two adjacent surfaces of the polarization beam splitter 31. The stereoscopic image display system has a troublesome problem in that the two liquid crystal display panels 26 and 28 require an illumination unit respectively and are displayed in parallel with the two adjacent surfaces of the polarization beam splitters 31. In order to solve the problem, an illumination unit 63 can be manufactured to fix the two liquid crystal display panels 26 and 28 and to enable illumination to be made with one light source.

FIG. 6a is a view for showing a cross-sectioned structure of the stereoscopic image display system, indicating an embodiment of an illustration unit for radiating light on the two liquid crystal display panels 26 and 28 as one light source in the necessity of the illumination unit of FIG. 2.

As shown in FIG. 6a, in the illumination unit 63, a light source 67 is placed at an apex 66 where two lines 64 and 65 of the same length perpendicular to each other along which the two first and second liquid crystal display panels 26 and 28 of the same size are disposed are met, and a spherical mirror 70, which is a reflection mirror, is provided between the sides 68 and 69 of the two liquid crystal display panels 26 and 28 positioned near to the apex 66. Accordingly, the light source illuminating the two liquid crystal display panels 26 and 28 and image plates are enclosed with three first, second, and third reflecting surfaces 71, 72, and 73 respectively formed in the right angle, and the two first and second reflecting surfaces become left and right sides and the remaining third reflecting surface 73 becomes an upper side.

In this case, in a way for the first and second liquid crystal display panels 26 and 28 to be illuminated by the light source 67, first, second, and third imaginary light sources as to the first, second, and third reflection surfaces 71, 72, and 73 at first, second, and third symmetry points 74, 75, and 76 can be assumed, and fourth and fifth imaginary light sources 97 and 98 by the reflection mirror can be also assumed as imaginary light sources at a point where a focus is made through reflection by the reflection mirror 70. Therefore, in images by the reflection mirror, a focus of reflected light is made on the lower side in case of a convex reflection mirror, so that a point indicated on the lower side becomes the fourth imaginary light source 97, and, in case of a concave reflection mirror, an image of a light source is made at a point of a upper side through reflection from the concave surface, so that the image becomes the fifth imaginary light source 98 of the concave reflection mirror as to the light source 67 as seen in FIG. 6a.

As stated above, in case that light irradiated from the light source 67 travels, in a circular form, toward the third reflection surface 73 arranged on the upper side, the reflection mirror 70 reflects the light traveling in an opposition direction with the third reflection surface 73 and directs the light toward the third reflection surface 73. Accordingly, the reflection mirror 70 directs all the light of the light source 67 to the first and second liquid crystal display panels 26 and 28 through the first, second, and third reflection surfaces 71, 72, and 73.

The width of the reflection mirror 70 is determined within the range in which a reflected light can reach all of the liquid crystal display panels 26 and 28 if a light reflected by the reflection mirror 70 is reflected again at the third reflection surface 73 and is projected to the liquid crystal display panels 26 and 28 or a light reflected by the third reflection surface 73 is reflected again at the first and second reflection surfaces 71 and 72.

First of all, the first symmetry point 74 as to the left first reflection surface 71 of the light source 67 becomes an imaginary light source as an image of the light source reflected on the reflection surface about the first reflection surface 71, and, since light emitted from the imaginary light source for the light source 67 constituted at the first symmetry point 74 illuminates the upper and lower ends of the first reflection surface 71, only the light within a first illumination angle range composed of the first and second light rays 81 and 82 directly illuminates the first liquid crystal display panel 26. There is an illumination angle 83 at which an imaginary light source located at the first symmetry point 74 illuminates the first liquid crystal display panel 26. A line 84 links the first symmetry point 74 and the upper end 79 of the second reflection surface 72. Light within a second illumination angle range incident on the third reflection surface 73 illustrates like there is a light source at a fourth symmetry point 85 based on the third reflection surface 73 as to an imaginary light source occurring at the first symmetry point 74 by the left first reflection surface 71 of the light source 67, to thereby illuminate the second reflection surface 72 in a direction defined as a third illumination angle 86. The light is reflected from the second reflection surface 72, so that part of the light become incident on the second liquid crystal display panel and the rest keeps being reflected in space between lines linking the third reflection surface 73 and the first and third symmetry points 74 and 76, to thereby produce a loss of light from the light source to be used for illumination.

In case that the light source 67 is reflected from the upper side of the third reflection surface 73, since a path of the light source is in the same light path as one of illuminating light from the second symmetry point 75 as to the light source 67 about the upper side of the third reflection surface 73, an imaginary light source of the light source constituted at the second symmetry point 75 of the upper side of the third reflection surface 73 leads to the same effect as illuminating light between the left and right ends 77 and 79 of the third reflection surface 73 with a fourth illumination angle. There is an illumination angle 87 at which the second symmetry point 75 illuminates the third reflection surface 73. There is an illumination angle 88 at which an imaginary light source located at the second symmetry point 75 illuminates the first liquid crystal display panel 26. There is an angle 89 formed from the intersection of a line made by the side 68 of the first liquid crystal display panel 26 at the second symmetry point 75 and a line made by the side 69 of the second liquid display panel 28 at the second symmetry point 75. There is an illumination angle 91 at which an imaginary light source located at the second symmetry point 75 illuminates the second liquid crystal display panel 28.

Since light within fifth and seventh illumination angle ranges 88 and 91 illuminates the first and second liquid crystal display panels 26 and 28 in a direction of about 45 degrees and light given in sixth and eighth illumination angles 90 and 92 illuminates the area between the lower and upper ends 77 and 78 of the first reflection surface 71 and the area between the lower and upper ends 79 and 80 of the second reflection surface respectively, the light leads to the same effect as illuminating the first and second reflection surfaces 71 and 72 with ninth and tenth illumination angles 95 and 96 by the first and second reflection surfaces 71 and 72 of the second symmetry point 75 and fourth and fifth symmetry points 85 and 93 as to the respective first and second reflection surfaces, so that most of the light of the light source illuminates the first and second liquid crystal display panels 26 and 28.

If each of the line between the upper end 77 and the lower end 78 of the first reflection surface 71 and the line between the upper end 79 and the lower end 80 of the second reflection surface 72 is 1.5 times longer than the distance from the line 220 between the lower end 78 of the first reflection surface 71 and the lower end 80 of the second reflection surface 72 to the light source 67, the fourth symmetry point 85 is on the first central vertical line 101 of the first liquid crystal display panel 26 and the fifth symmetry point 93 is on the second central vertical line 102 of the second liquid crystal display panel 28, to thereby the fourth and fifth symmetry points 85 and 93 illuminate the first and second liquid crystal display panels 26 and 28 in the 90 degree direction. In this case, the ninth and tenth illumination angles 95 and 96 becomes about 38 degrees.

An image of the light source 67 by the reflection mirror 70 is a light source as an imaginary light source produced by the reflection mirror in case that the reflection mirror 70 is a convex type 99 and the light source is formed at a focus of the lower side of the reflection mirror, so that the imaginary light source is formed on the lower side of the reflection mirror 70 as in a sixth imaginary light source 97, and, in case of a concave type 100, a focus is reflected, that is, since a focus is made on a line segment of the straight line on which the light source 67 is placed and then light travels in a conical shape, an imaginary light source is formed on the upper side of the light source 67 like a seventh imaginary light source 98 as an imaginary light source as to a concave mirror of the light source 67.

Light reflected by the reflection mirror 70 is the same as the illumination based on the sixth and seventh imaginary light sources 97 and 98.

Since the sixth and seventh imaginary light sources 97 and 98 are on a symmetrical plane which bisects the illumination unit 63 together with the light source 67, the form of illumination is similar to the form of illumination based on the light source 67 except for a difference in positions.

Even the case of a beam within the fifth illumination angle range that light reflected by the third reflection surface 73 of the light source 67 are re-incident on the reflection mirror 70 is similar to illumination based on the sixth and seventh imaginary light sources 97 and 98.

FIG. 6b is a cross-sectioned view of an illumination unit for increasing a light amount symmetrically incident in a 90 degree direction on the first and second liquid crystal display panels 26 and 28, which is formed for the fourth and fifth reflection surfaces 106 and 107 of the left and right sides shown in FIG. 6a to have a 30 degree angle as to the first and second liquid crystal display panels, and in the form of the sixth and seventh reflection surfaces 108 and 109 having a 90 degree angle there between by dividing the third reflection surface 73 of the upper side shown in FIG. 6a into two parts of the same length.

The fourth and fifth reflection surfaces 106 and 107 of the left and right sides of the illumination unit 63 form angles 104 and 105 of 30 degrees with the first and second line 64 and 65 perpendicularly crossing each other on which the first and second liquid crystal display panels 26 and 28 are lying, and the fourth and fifth reflection surfaces 108 and 109 form angles 110 and 111 of 45 degrees with a second symmetry line 94 crossing the illumination unit 63.

Further, a third line segment which is a corner on which the fourth and fifth reflection surfaces 106 and 108 are met is defined as follows.

That is, the corner at which a line 114 linking a sixth symmetry point 113 working as an imaginary light source by the fourth reflection surface 106 and a first side 68 of the first liquid crystal display panel 26 meet the fourth reflection surface 106 is a third line segment 103.

A fourth line segment 115 at which the sixth and seventh reflection surfaces 107 and 109 are met is defined in the same method as above.

The sixth symmetry point 113 is on a first vertical center line of the first liquid crystal display panel 26, to thereby uniformly illuminate the first liquid crystal display panel 26.

An angle 215 for the sixth symmetry point 113 to illuminate the fourth reflection surface 106 is about 60 degrees.

The sixth reflection surface 108 is placed in parallel with the first liquid crystal display panel 26, the illumination of the light source 67 through the sixth reflection surface 108 is the same as the illumination at an eleventh illumination angle 112 of about 75 degrees from an imaginary light source at a seventh symmetry point 116 as to the sixth reflection surface 108 of the light source 67. A twelfth illumination angle 117 which is part of the eleventh illumination angle 112 by the imaginary light source of the seventh symmetry point 116 based on the light source 67 illuminates the first liquid crystal display panel 26. The light source 67 illuminates the reflection mirror 70 covering a thirteenth illumination angle 118. The light source 67 illuminates the second liquid crystal display panel 28 covering a fourteenth illumination angle 119. The light source illuminates the fifth reflection surface 107 by covering a fifteenth illumination angle 120.

The Light within the fifteenth illumination angle 120 illuminating the fifth reflection surface 107 illuminates the second liquid crystal display panel 28 at the fifteenth illumination angle 120 at an eighth symmetry point 122 as to the fifth reflection surface 107 of the seventh symmetry point 116.

Most of light within the fifteenth illumination angle 120 illuminates the second liquid crystal display panel 28.

Most of light of the sixteenth illumination angle 121 reflected from the seventh reflection surface 109 becomes incident on the second liquid crystal display panel 28 directly or via the fifth reflection surface 107.

Light from the light source based on the reflection mirror 70 is given as illumination by a symmetry point as to the respective reflection surfaces of the sixth and seventh imaginary light sources 97 and 98 by the reflection mirror 70 of the light source 67.

In case that the reflection mirror 70 is formed in a convex type, since the first imaginary light source 97 is placed lower than the light source 67, a symmetry point as to the reflection surface of the image 97 and the fourth and sixth reflection surfaces 106 and 108 is produced lower than the sixth and seventh symmetry points 113 and 116 of the light source 67 as to the above reflection surfaces so that an incident angle of the light illuminated on the first and second liquid crystal display panel 26 and 28 becomes smaller than the direct illumination by the light source 67, and, in case that the reflection mirror 70 is formed in a concave type, a symmetry point as to the fourth and sixth reflection surfaces 106 and 108 of the seventh imaginary light source 98 is produced higher so that the incidence angle becomes larger.

If the angles 110 and 111 that the sixth and seventh reflection surfaces 108 and 109 are formed with the symmetry line 94 of the illumination unit 63 are less than 45 degrees, since the position of the seventh symmetry point 116 becomes closer to the symmetry line 94, similarly leading to the illumination by the second symmetry point 75 of FIG. 6a, so that incident angles of the illumination light on the first and second liquid crystal display panel 26 and 28 become larger.

Therefore, by using, instead of the light source 67, two identical second and third light sources 123 and 124 in symmetry on the left and right of the symmetry line 94 slightly lower than the light source 67, incident angles of light illuminated on the first and second liquid crystal display panels 26 and 28 can be minimized.

Since the illumination unit 63 are in symmetry with respect to the symmetry line 94, illumination by the fifth and seventh reflection surfaces 107 and 109 of the light source 67 are the same as in the case of the fourth and sixth reflection surfaces 106 and 108.

Used as the light source 67 is a cylindrical lamp 125 arranged in a direction vertical to the ground, a light-emitting diode(LED) array, or an array of point light sources 126 placed in certain intervals.

Figure 7:
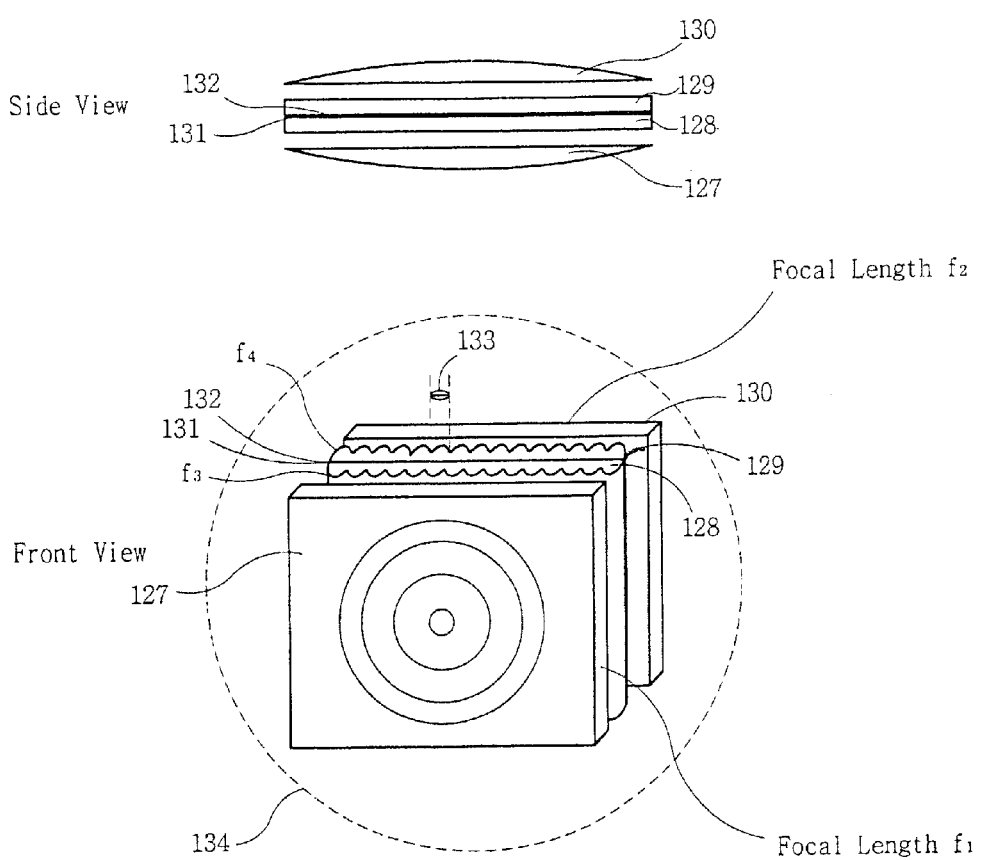
FIG. 7 is a view for showing an image projection screen of a stereoscopic image display system.

FIG. 7 is an illustrative view for showing the image projection screen shown in FIG. 2 according to an embodiment of the present invention.

Used as a stereoscopic image projection screen is a lenticular plate having an optical converging power, a Fresnel lens, a holographic screen, a parallax barrier plate, or an integral photography plate.

Such plates have different characteristics, so that it is common for each plate to be used alone.

An image projection screen used for the present invention is a screen manufactured in combination of the lenticular plate and the Fresnel lens, facilitating the magnification and contraction of a viewing zone.

A screen 134 has a structure that includes two first and second lenticular plates 128 and 129 that are disposed between two first and second Fresnel lenses 127 and 130, in which the first and second Fresnel lenses 127 and 130 have different focal lengths of f1 and f2 and the first and second lenticular plates 128 and 129 have different focal lengths of f3 and f4 in a horizontal direction and widths identical to the focal lengths respectively. When the first lenticular plate 128 has a focal length of f3, the width of the first lenticular plate 128 is f3. When the second lenticular plate 129 has a focal length of f4, the width of the second lenticular plate 129 is f4. As shown in FIG. 7, the flat side 131 of the first lenticular plate 128 and the flat side 132 of the second lenticular plate 129 touch each other.

The pitches 133 of the cylindrical lenses constituting the first and second lenticular plates 128 and 129 are the same, a value of the width 133 has a value smaller than or the same value as a size of one pixel of an image projected from the image display unit 25, and has to have a value a viewer does not recognize when viewing in a viewing zone.

Since a magnification given by the image projection screen 134 is (f3/f1)*(f2/f4), if an exit pupil of a projection lens is positioned at the focal length f1 of the first Fresnel lens 127, a screen of forming a viewing zone of a desired size can be manufactured by selecting focal values of other lenses.

Further, micro lens array plates can be used instead of the first and second lenticular plates 128 and 129. At this time, a diameter of the micro lens is the same of the width of the cylindrical lens of the first and second lenticular plates 128 and 129, and the focal length is also the same as that of the corresponding lenticular plates.

The image projection screen used for the present invention plays a role of forming a viewing zone in an area of a viewing point of a viewer by contracting or magnifying by respective lenses an image projected by the above magnification.

Figure 8:
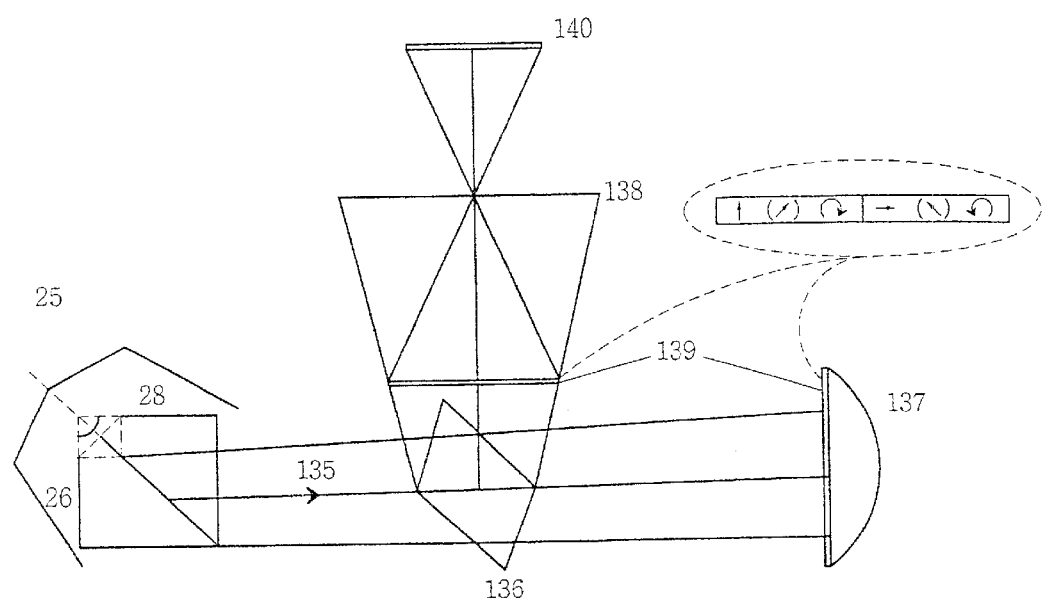
FIG. 8 is a view for showing a stereoscopic image display unit using a reflection mirror.

FIG. 8 is a view for showing a stereoscopic image system using a reflection mirror instead of a projection lens according to an embodiment of the present invention.

An image beam 135 combining two images which correspond to the left and right eyes and have a 90 degree difference of a polarization direction to each other becomes incident on the reflection mirror 137 via a beam splitter 136 of a plate type.

The image beam 135 incident on the reflection mirror 137 is split by the beam splitter 136 to be incident on the image projection screen 138.

A view of the images displayed on the first and second liquid crystal display panels 26 and 28 are focused on the image projection screen 138 by the reflection mirror 137.

It is possible that a polarization plate 139 having the same polarization directions as those of the left and right images from the image display unit 25 is disposed vertically and near to the surface of the reflection mirror 137 with an optical axis or at any position on the side of the image projection screen 138 of the plate-type beam splitter 136.

However, the size of the plate-type polarization plate 139 can cover the entire image beam at the position.

The plate-type beam splitter 136 causes the image projection screen 138 to form an angle of 90 degrees with the reflection mirror 137.

Through the above steps, the view 140 of the polarization plate 139 by the image projection screen 138 is given as a viewing zone.

Although a liquid crystal display panel is used as an image display unit corresponding to the left and right eyes in the structure according to an embodiment of the present invention, the image display unit according to the present invention includes any image display device panel having certain polarization characteristics, not limited to the liquid crystal display panel having a certain polarization.

Although the preferred embodiments of the present invention have been described, it will be understood by those skilled in the art that the present invention should not be limited to the described preferred embodiments, but various changes and modifications can be made within the spirit and scope of the present invention as defined by the appended claims.

What is claimed is:

1. A stereoscopic image display system using polarization characteristics of a liquid crystal display panel, in a micro stereoscopic image display system, comprising:
an image display unit comprising:
at least one liquid crystal display panel having polarization characteristics of certain directions;
an illumination unit for illuminating the liquid crystal display panel from a rear side; and
a polarization plate having different polarization characteristics of the liquid crystal display panel, and for projecting image beams having image signals of different polarization characteristics;
a projection lens disposed on the front of the image display unit, and for magnifying an image and controlling a focus of the image;
a polarization plate disposed opposite to the projection lens at either of an entrance pupil or an exit pupil of the projection lens, and having different polarization characteristics in a left and a right surface about a vertical center line; and
an image projection screen, when beams containing images corresponding to the left and right eyes is outputted with different polarization characteristics from the image display unit, for magnifying the beams through the projection lens, splitting and outputting a left-eye image and a right-eye image through the polarization plate, projecting the outputted image beams, and forming viewing zones of different images on the left eye and the right eye.

2. A stereoscopic image display system using polarization characteristics of a liquid crystal display panel, in a micro stereoscopic image display system, comprising:
an image display unit comprising:
at least one liquid crystal display panel having polarization characteristics of certain directions;
in illumination unit for illuminating the liquid crystal display panel from a rear side; and
a polarization plate having different polarization characteristics of the liquid crystal display panel, and for projecting image beams having image signals of different polarization characteristics;
a projection lens disposed on the front of the image display unit, and for magnifying an image and controlling a focus of the image;
a polarization plate disposed opposite to the projection lens at either of an entrance pupil or an exit pupil of the projection lens, and having different polarization characteristics in a left and a right surface about a vertical center line;
an image projection screen, when beams containing images corresponding to the left and right eyes is outputted with different polarization characteristics from the image display unit, for magnifying the beams through the projection lens, splitting and outputting a left-eye image and a right-eye image through the polarization plate, projecting the outputted image beams, and forming viewing zones of different images on the left eye and the right eye;
a liquid crystal display panel for periodically outputting image signals corresponding to the left eye and the right eye;
an illumination unit for illuminating the liquid crystal display panel in order to project the image beams having images the liquid crystal display panel outputs; and
a phase retarder disposed on the front side of the liquid crystal display panel in a direction the image beams of the liquid crystal display panel travels, and electronically turned on and off to correspond to periodic changes of the images of the left eye and the right eye outputted from the liquid crystal display panel, and for delaying a phase in order for either of the image beams corresponding to the left and right eyes to have a different phase.

3. A stereoscopic image display system using polarization characteristics of a liquid crystal display panel, in a micro stereoscopic image display system, comprising:
an image display unit comprising:
at least one liquid crystal display panel having polarization characteristics of certain directions;
an illumination unit for illuminating the liquid crystal display panel from a rear side; and
a polarization plate having different polarization characteristics of the liquid crystal display panel, and for projecting image beams having image signals of different polarization characteristics;
a projection lens disposed on the front of the image display unit, and for magnifying an image and controlling a focus of the image;
a polarization plate disposed opposite to the projection lens at either of an entrance pupil or an exit pupil of the projection lens, and having different polarization characteristics in a left and a right surface about a vertical center line; and
an image projection screen, when beams containing images corresponding to the left and right eyes is outputted with different polarization characteristics from the image display unit, for magnifying the beams through the projection lens, splitting and outputting a left-eye image and a right-eye image through the polarization plate, projecting the outputted image beams, and forming viewing zones of different images on the left eye and the right eye, the image display unit comprises:
two liquid crystal display panels forming the right angle to each other and constructed to project the image beams having image signals of different polarization characteristics to an area of an acute angle out of areas forming the right angle;
an illumination unit for illuminating the two liquid crystal display panels; and
a polarization beam splitter disposed in the acute angle area formed in the junction of the two liquid crystal display panels, and for adding and traveling in a direction the image beams outputted from the two liquid crystal display panels.

4. The stereoscopic image display system as claimed in claim 3, further comprising, a phase retarder disposed on the front side of either of the two liquid crystal display panels, and for delaying a phase of either of the image beams projected from the two liquid crystal display panels when the polarization characteristics of the two liquid crystal display panels in the image display unit are the same.

5. The stereoscopic image display system as claimed in claim 1, the polarization characteristics of the liquid crystal display panel being linear polarization characteristics.

6. The stereoscopic image display system as claimed in claim 2, the polarization characteristics of the liquid crystal display panel being linear polarization characteristics.

7. The stereoscopic image display system as claimed in claim 3, the polarization characteristics of the liquid crystal display panel being linear polarization characteristics.

8. The stereoscopic image display system as claimed in claim 1, the polarization characteristics of the liquid crystal display panel being circular polarization characteristics.

9. The stereoscopic image display system as claimed in claim 2, the polarization characteristics of the liquid crystal display panel being circular polarization characteristics.

10. The stereoscopic image display system as claimed in claim 3, the polarization characteristics of the liquid crystal display panel being circular polarization characteristics.

11. The stereoscopic image display system as claimed in claim 4, the phase retarder linearly polarizes either of the image beams corresponding to the left eye or the right eye in order for the image beams corresponding to the left and right eyes outputted from the liquid crystal display panel to have a phase difference of 90 degrees when the liquid crystal display panel has the linear polarization characteristics.

12. The stereoscopic image display system as claimed in claim 4, the phase retarder being a quarter wavelength wave plate of circularly polarize the image beams corresponding to the left and right eyes to have circular polarizations of a different direction to each other when the liquid crystal display panel has the circular polarization characteristics.

13. A stereoscopic image display system using polarization characteristics of a liquid crystal display panel, in a micro stereoscopic image display system, comprising:
an image display unit comprising:
at least one liquid crystal display panel having polarization characteristics of certain directions;
an illumination unit for illuminating the liquid crystal display panel from a rear side; and
a polarization plate having different polarization characteristics of the liquid crystal display panel, and for projecting image beams having image signals of different polarization characteristics;
a projection lens disposed on the front of the image display unit, and for magnifying an image and controlling a focus of the image;
a polarization plate disposed opposite to the projection lens at either of an entrance pupil or an exit pupil of the projection lens, and having different polarization characteristics in a left and a right surface about a vertical center line; and
an image projection screen, when beams containing images corresponding to the left and right eyes is outputted with different polarization characteristics from the image display unit, for magnifying the beams through the projection lens, splitting and outputting a left-eye image and a right-eye image through the polarization plate, projecting the outputted image beams, and forming viewing zones of different images on the left eye and the right eye, the polarization plate including a vertical polarization surface and a horizontal polarization surface based on a vertical center line which bisects the polarization plate into the left and right in order for the polarization characteristics of the left and right sides to have a 90 degree difference to each other.

14. The stereoscopic image display system as claimed in claim 13, the polarization plate having different circular polarization characteristics.

15. The stereoscopic image display system as claimed in claim 13, further comprising a head tracking system for moving the polarization plate in order for the polarization plate to track the left and right eyes of a viewer which move with the movements of viewing points of the viewer and to provide image views corresponding to the moved left and right eyes of the viewer.

16. The stereoscopic image display system as claimed in claim 14, further comprising a head tracking system for moving the polarization plate in order for the polarization plate to track the left and right eyes of a viewer which move with the movements of viewing points of the viewer and to provide image views corresponding to the moved left and right eyes of the viewer.

17. The stereoscopic image display system as claimed in claim 1, the image projection screen having a pair of lenticular plates having different focal lengths disposed between two Fresnel lenses having different focal lengths, the pair of lenticular plates having the same pitches and formed by joining to each other in a substrate-to-substrate basis, and the thickness of a lenticular plate being the same as a focal length of the lenticular plate.

18. The stereoscopic image display system as claimed in claim 17, the lenticular plate having a cylindrical lens with a width being smaller than or the same as one pixel size of an image projected from the image display unit.

19. The stereoscopic image display system as claimed in claim 17, the image projection screen comprising a micro lens array plate disposed between the Fresnel lenses, a diameter of the array plate coinciding with the width of the cylindrical lens of the lenticular plate, and a focal distance of the array plate being the same as that of the lenticular plate.

20. The stereoscopic image display system as claimed in claim 18, the image projection screen comprising a micro lens array plate disposed between the Fresnel lenses, a diameter of the array plate coinciding with the width of the cylindrical lens of the lenticular plate, and a focal distance of the array plate being the same as that of the lenticular plate.

21. The stereoscopic image display system as claimed in claim 1, the exit pupil of the projection lens being disposed at a focus positioned toward the image display unit of a Fresnel lens disposed opposite to the projection lens out of Fresnel lenses constructed in the image projection screen.

22. A stereoscopic image display system using polarization characteristics of a liquid crystal display panel, in a micro stereoscopic image display system, comprising:
an image display unit comprising:
at least one liquid crystal display panel having polarization characteristics of certain directions;
an illumination unit for illuminating the liquid crystal display panel from a rear side; and
a polarization plate having different polarization characteristics of the liquid crystal display panel, and for projecting image beams having image signals of different polarization characteristics;
a projection lens disposed on the front of the image display unit, and for magnifying an image and controlling a focus of the image;
a polarization plate disposed opposite to the projection lens at either of an entrance pupil or an exit pupil of the projection lens, and having different polarization characteristics in a left and a right surface about a vertical center line; and
an image projection screen, when beams containing images corresponding to the left and right eyes is outputted with different polarization characteristics from the image display unit, for magnifying the beams through the projection lens, splitting and outputting a left-eye image and a right-eye image through the polarization plate, projecting the outputted image beams, and forming viewing zones of different images on the left eye and the right eye, the illumination unit of the image display unit, comprising:
a reflection unit constructed by removing a volume of a cube in a shape of a triangular pyramid toward a center from both corners of one side of a cube, and having a first reflection surface on the left side, a second reflection surface on the right side, and a third reflection surface on the upper side which are formed inside the surfaces of the cube unremoved;
two surfaces disposed to correspond to the first liquid crystal display panel and the second liquid crystal display panel for forming 90 degrees in the reflection unit;
a light source disposed in a center of a boundary line forming a line met inside the reflection unit through extension of two surfaces of the reflection unit in which the two liquid crystal display plates are placed; and
a reflection mirror having a cylindrical surface formed in a quarter arc shaped from an upper side to a lower side of the inside corners, and joining the respective corners of the cylindrical surfaces in the reflection unit in order for the surfaces on two liquid crystal display panels are respectively placed to correspond to the two surfaces of the fan-shaped cylinder respectively, and for circularly reflecting light radiated out of the light source from the inside surface curved in the fan shape formed from the upper side to the lower side of the fan-shaped cylinder to the inside of the reflection unit about a vertical line of corners.

23. The stereoscopic image display system as claimed in claim 2, the illumination unit of the image display unit, comprising:
a reflection unit constructed by removing a volume of a cube in a shape of a triangular pyramid toward a center from both corners of one side of a cube, and having a first reflection surface on the left side, a second reflection surface on the right side, and a third reflection surface on the upper side which are formed inside the surfaces of the cube unremoved;
two surfaces disposed to correspond to the first liquid crystal display panel and the second liquid crystal display panel for forming 90 degrees in the reflection unit;
a light source disposed in a center of a boundary line forming a line met inside the reflection unit through extension of two surfaces of the reflection unit in which the two liquid crystal display plates are placed; and
a reflection mirror having a cylindrical surface formed in a quarter arc shaped from an upper side to a lower side of the inside corners, and joining the respective corners of the cylindrical surfaces in the reflection unit in order for the surfaces on which two liquid crystal display panels are respectively placed to correspond to the two surfaces of the fan-shaped cylinder respectively, and for circularly reflecting light radiated out of the light source from the inside surface curved in the fan shape formed from the upper side to the lower side of the fan-shaped cylinder to the inside of the reflection unit about a vertical line of corners.

24. The stereoscopic image display system as claimed in claim 3, the illumination unit of the image display unit, comprising:
a reflection unit constructed by removing a volume of a cube in a shape of a triangular pyramid toward a center from both corners of one side of a cube, and having a first reflection surface on the left side, a second reflection surface on the right side, and a third reflection surface on the upper side which are formed inside the surfaces of the cube unremoved;
two surfaces disposed to correspond to the first liquid crystal display panel and the second liquid crystal display panel for forming 90 degrees in the reflection unit;
a light source disposed in a center of a boundary line forming a line met inside the reflection unit through extension of two surfaces of the reflection unit in which the two liquid crystal display plates are placed; and a reflection mirror having a cylindrical surface formed in a quarter arc shaped from an upper side to a lower side of the inside corners, and joining the respective corners of the cylindrical surfaces in the reflection unit in order for the surfaces on which two liquid crystal display panels are respectively placed to correspond to the two surfaces of the fan-shaped cylinder respectively, and for circularly reflecting light radiated out of the light source from the inside surface curved in the fan shape formed from the upper side to the lower side of the fan-shaped cylinder to the inside of the reflection unit about a vertical line of corners.

25. The stereoscopic image display system as claimed in claim 4, the illumination unit of the image display unit, comprising:

a reflection unit constructed by removing a volume of a cube in a shape of a triangular pyramid toward a center from both corners of one side of a cube, and having a first reflection surface on the left side, a second reflection surface on the right side, and a third reflection surface on the upper side which are formed inside the surfaces of the cube unremoved;

two surfaces disposed to correspond to the first liquid crystal display panel and the second liquid crystal display panel for forming 90 degrees in the reflection unit;

a light source disposed in a center of a boundary line forming a line met inside the reflection unit through extension of two surfaces of the reflection unit in which the two liquid crystal display plates are placed; and a reflection mirror having a cylindrical surface formed in a quarter arc shaped from an upper side to a lower side of the inside corners, and joining the respective corners of the cylindrical surfaces in the reflection unit in order for the surfaces on which two liquid crystal display panels are respectively placed to correspond to the two surfaces of the fan-shaped cylinder respectively, and for circularly reflecting light radiated out of the light source from the inside surface curved in the fan shape formed from the upper side to the lower side of the fan-shaped cylinder to the inside of the reflection unit about a vertical line of corners.

26. The stereoscopic image display system as claimed in claim 22, the reflection unit being constructed with an area left after removing a volume of a cube in a shape of a triangular pyramid toward a center from both corners on one side of the cube, and having a left fourth reflection surface constructed to have an angle of 30 degrees as to a left surface out of two surfaces constructed on inside surfaces formed by the removal, a right fifth reflection surface constructed to have an angle of 30 degrees as to a right surface out of the two surfaces, the light source and an extended surface of the fourth reflection surface joined with 90 degrees to each other, a sixth reflection surface of an upper left side, joining respective corners in 90 degrees for each of the corners to have 45 degrees as to a vertical surface linking a corner an extended surface of the fifth reflection surface meets, and non-joined respective other corners meeting with the fourth reflection surface at the upper left side, and a seventh reflection surface meeting with the fifth reflection surface.

27. The stereoscopic image display system as claimed in claim 26, the light source being a linear light source placing an center at a corner met through extension of two surface on the two liquid crystal display panels are positioned and arranged from the upper side to the lower side along the line.

28. The stereoscopic image display system as claimed in claim 26, the light source being plural point light sources arranged with certain intervals from the upper side to the lower side of a line forming a corner at which an extended plane on which the two liquid crystal display panels meet.

29. The stereoscopic image display system as claimed in claim 26, the light source being plural light-emitting devices arranged with certain intervals from the upper side to the lower side of a line forming a corner at the extended plane on the two liquid crystal display panels meet.

30. The stereoscopic image display system as claimed in claim 26, the light source being two linear light sources placing a center at a corner at which an extended plane of the two surfaces on the two liquid crystal display panels are positioned meets, and arranged in certain intervals and in parallel from the upper side to the lower side while maintaining a certain interval bilaterally from the corner.

31. The stereoscopic image display system as claimed in claim 30, wherein the linear light source includes plural point light sources.

32. The stereoscopic image display system as claimed in claim 31, a line segment where the fourth reflection surface meets with the sixth reflection surface being positioned on a line linking an upper side of the first liquid crystal display panel to a symmetry point of the light source as to the fourth reflection surface, and a line segment where the fifth reflection surface meets with the seventh reflection surface being positioned on a line linking an upper side of the second liquid crystal display panel to an symmetry point of the light source as to the fifth reflection surface.

33. The stereoscopic image display system as claimed in claim 22, the reflection mirror being a concave reflection mirror with respect to an inside surface of the reflection unit.

34. The stereoscopic image display system as claimed in claim 22, the reflection mirror being a convex reflection mirror with respect to an inside surface of the reflection mirror.

35. The stereoscopic image display system as claimed in claim 33, the reflection mirror having a width enabling light reflected by first and second reflection surfaces to reach a lower side of the first and second reflection surfaces from the light source.

36. The stereoscopic image display system as claimed in claim 34, the reflection mirror having a width enabling light reflected by first and second reflection surfaces to reach a lower side of the first and second reflection surfaces from the light source.

37. A method of a stereoscopic image display system using polarization characteristics of a liquid crystal display panel, in a micro stereoscopic image display system, comprising the steps of:

forming an image display unit comprising the steps of:
   forming at least one liquid crystal display panel having polarization characteristics of certain directions;
   attaching an illumination unit for illuminating the liquid crystal display panel from a rear side; and
   mounting a polarization plate having different polarization characteristics of the liquid crystal display panel, and for projecting image beams having image signals of different polarization characteristics;

disposing a projection lens on the front of the image display unit, and for magnifying an image and controlling a focus of the image;

disposing a polarization plate opposite to the projection lens at either of an entrance pupil or an exit pupil of the projection lens, and having different polarization characteristics in a left and a right surface about a vertical center line; and disposing an image projection screen, when beams containing images corresponding to the left and right eyes is outputted with different polarization characteristics from the image display unit, for magnifying the beams through the projection lens, splitting and outputting a left-eye image and a right-eye image through the polarization plate, projecting the outputted image beams, and forming viewing zones of different images on the left eye and the right eye.

38. The method as claimed in claim 37, further comprising the steps of:

disposing a liquid crystal display panel for periodically outputting image signals corresponding to the left eye and the right eye;

disposing an illumination unit for illuminating the liquid crystal display panel in order to project the image beams having images the liquid crystal display panel outputs; and disposing a phase retarder on the front side of the liquid crystal display panel in a direction the image beams of the liquid crystal display panel travels, and electronically turned on and off to correspond to periodic changes of the images of the left eye and the right eye outputted from the liquid crystal display panel, and for delaying a phase in order for either of the image beams corresponding to the left and right eyes to have a different phase.

39. The method as claimed in claim 37, forming the image display unit by the steps of:

inserting two liquid crystal display panels forming the right angle to each other and constructed to project the image beams having image signals of different polarization characteristics to an area of an acute angle out of areas forming the right angle;

positioning an illumination unit for illuminating the two liquid crystal display panels; and disposing a polarization beam splitter in the acute angle area formed in the junction of the two liquid crystal display panels, and for adding and traveling in a direction the image beams outputted from the two liquid crystal display panels.

40. The method as claimed in claim 39, further comprising the step of disposing a phase retarder on the front side of either of the two liquid crystal display panels, and for delaying a phase of either of the image beams projected from the two liquid crystal display panels when the polarization characteristics of the two liquid crystal display panels in the image display unit are the same.

41. The method of claim 37, the polarization characteristics of the liquid crystal display panel being linear polarization characteristics.

42. A stereoscopic image display system, comprising:

an image display unit;

a projection lens disposed on the front of the image display unit, and for magnifying an image and controlling a focus of the image;

a polarization plate disposed opposite to the projection lens at either of an entrance pupil or an exit pupil of the projection lens, and having different polarization characteristics in a left and a right surface about a vertical center line; and an image projection screen, when beams containing images corresponding to the left and right eyes is outputted with different polarization characteristics from the image display unit, for magnifying the beams through the projection lens, splitting and outputting a left-eye image and a right-eye image through the polarization plate, projecting the outputted image beams, and forming viewing zones of different images on the left eye and the right eye.

* * * * *